US012115638B2

(12) United States Patent
McNeil, III

(10) Patent No.: US 12,115,638 B2
(45) Date of Patent: Oct. 15, 2024

(54) BOTTLE OPENER WITH MAGNETIC CAP RETAINER

(71) Applicant: Willie McNeil, III, Yonkers, NY (US)

(72) Inventor: Willie McNeil, III, Yonkers, NY (US)

( * ) Notice: Subject to any disclaimer, the term of this patent is extended or adjusted under 35 U.S.C. 154(b) by 304 days.

(21) Appl. No.: 17/035,874

(22) Filed: Sep. 29, 2020

(65) Prior Publication Data

US 2022/0097221 A1 Mar. 31, 2022

(51) Int. Cl.

*B25F 1/04* (2006.01)
*B67B 7/04* (2006.01)
*B67B 7/16* (2006.01)
*B67B 7/46* (2006.01)

(52) U.S. Cl.

CPC .............. *B25F 1/04* (2013.01); *B67B 7/0423* (2013.01); *B67B 7/16* (2013.01); *B67B 7/30* (2013.01); *B67B 2007/0458* (2013.01)

(58) Field of Classification Search

CPC . B25F 1/04; B67B 7/04; B67B 7/0417; B67B 7/0447; B67B 7/0423; B67B 7/16; B67B 7/44; B67B 7/0452; B67B 7/066; B67B 7/0458; B67B 7/30; B67B 2007/0458

See application file for complete search history.

(56) References Cited

U.S. PATENT DOCUMENTS 2,542,329 A 2/1951 Hammond
2,762,246 A 9/1956 Gundelfinger
4,852,432 A 8/1989 Salcedo
5,862,720 A * 1/1999 McNellis ................ B67B 7/066 81/424.5
5,992,269 A * 11/1999 Puig ...................... B67B 7/0429 81/3.35
6,101,900 A * 8/2000 Traspuesto Miguel ...................... B67B 7/0429 81/3.36
6,176,154 B1 * 1/2001 Brucart Puig ........ B67B 7/0429 81/3.47
6,732,611 B2 * 5/2004 Miguel ................. B67B 7/0429 81/3.47
7,409,892 B2 8/2008 Monk
D624,378 S 9/2010 Wysopal (Continued)

FOREIGN PATENT DOCUMENTS

CN 114423704 A * 4/2022 ............... B67B 7/04
EP 0873965 B1 * 12/2004 ........... B67B 7/0429

(Continued)

*Primary Examiner* — David B. Thomas

(57) ABSTRACT

The bottle opener with magnetic cap retainer is a tool. The bottle opener with magnetic cap retainer is configured for use in opening a bottle. The bottle opener with magnetic cap retainer comprises a handle and a plurality of working elements. The handle is a grip used to manipulate each of the plurality of working elements. Each of the plurality of working elements forms a working element of the bottle opener with magnetic cap retainer used in the process of opening the bottle. The bottle opener with magnetic cap retainer removes a foil cover from the bottle. The bottle opener with magnetic cap retainer removes a cork from a bottle. The bottle opener with magnetic cap retainer removes a bottle cap from the bottle. The bottle opener with magnetic cap retainer stores the bottle cap that is removed from the bottle for future disposal.

14 Claims, 3 Drawing Sheets

(56) References Cited

U.S. PATENT DOCUMENTS

| | | | | |
|---|---|---|---|---|
| 8,015,642 | B1 * | 9/2011 | Oakley | B26B 11/001 7/155 |
| 9,114,968 | B2 | 8/2015 | Manger | |
| 9,695,026 | B2 | 7/2017 | Simmons | |
| 2006/0109886 | A1 * | 5/2006 | Harris | G01J 5/0265 374/141 |
| 2011/0119835 | A1 * | 5/2011 | Bates | B67B 7/44 7/155 |
| 2014/0123398 | A1 * | 5/2014 | Brike | B67B 7/0423 7/155 |
| 2016/0075545 | A1 | 3/2016 | Bishop | |
| 2016/0185582 | A1 * | 6/2016 | Crane | B67B 7/0423 81/3.09 |
| 2017/0225931 | A1 | 8/2017 | Farar | |

FOREIGN PATENT DOCUMENTS

| | | | | |
|---|---|---|---|---|
| EP | 3459905 B1 | * | 1/2022 | B67B 7/0423 |
| TW | 570894 B | * | 1/2004 | B67B 7/44 |
| WO | WO-2014096574 A1 | * | 6/2014 | B67B 7/0429 |

* cited by examiner

BOTTLE OPENER WITH MAGNETIC CAP RETAINER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of performing operations including opening bottles, more specifically, a hand operated device for opening a container. (B67B7/16)

SUMMARY OF INVENTION

The bottle opener with magnetic cap retainer is a tool. The bottle opener with magnetic cap retainer is configured for use in opening a bottle. The bottle opener with magnetic cap retainer comprises a handle and a plurality of working elements. The handle is a grip used to manipulate each of the plurality of working elements. Each of the plurality of working elements forms a working element of the bottle opener with magnetic cap retainer used in the process of opening the bottle. The bottle opener with magnetic cap retainer removes a foil cover from the bottle. The bottle opener with magnetic cap retainer removes a cork from a bottle. The bottle opener with magnetic cap retainer removes a bottle cap from the bottle. The bottle opener with magnetic cap retainer stores the bottle cap that is removed from the bottle for future disposal.

These together with additional objects, features and advantages of the bottle opener with magnetic cap retainer will be readily apparent to those of ordinary skill in the art upon reading the following detailed description of the presently preferred, but nonetheless illustrative, embodiments when taken in conjunction with the accompanying drawings.

In this respect, before explaining the current embodiments of the bottle opener with magnetic cap retainer in detail, it is to be understood that the bottle opener with magnetic cap retainer is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the bottle opener with magnetic cap retainer.

It is therefore important that the claims be regarded as including such equivalent construction insofar as they do not depart from the spirit and scope of the bottle opener with magnetic cap retainer. It is also to be understood that th phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
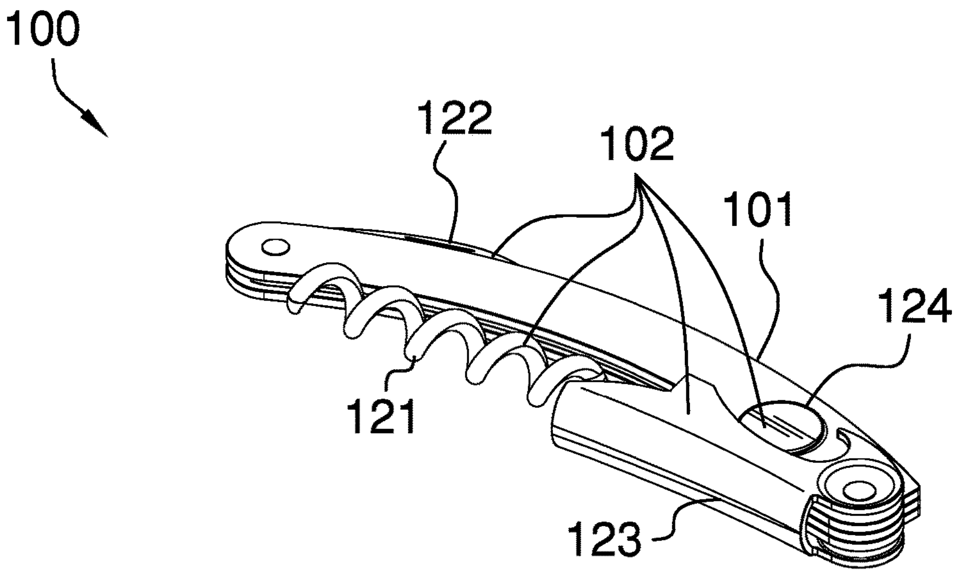
FIG. 1 is a perspective view of an embodiment of the disclosure.
Figure 2:
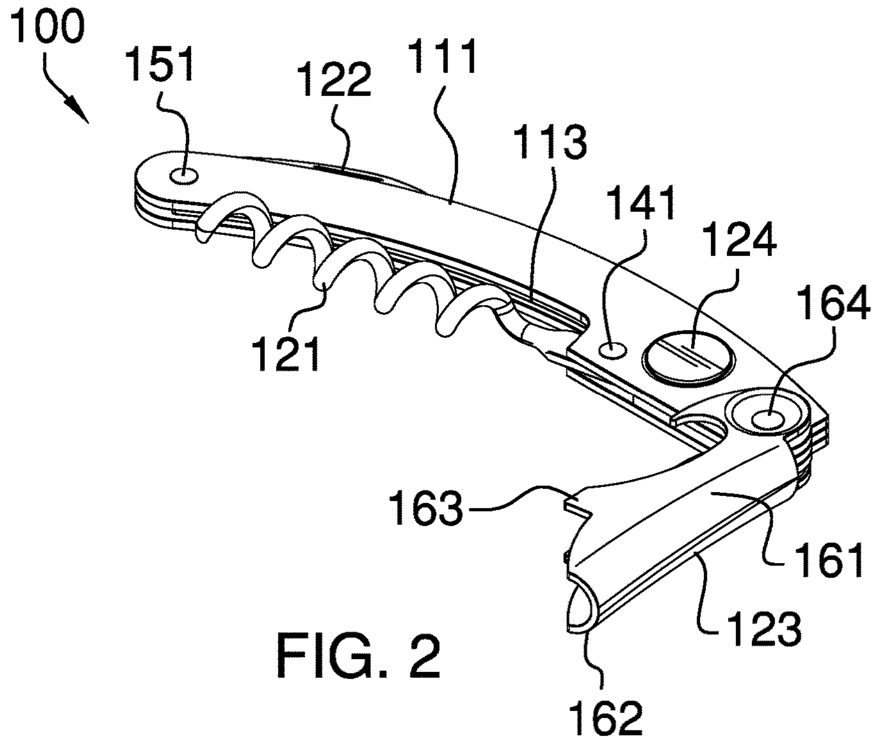
FIG. 2 is a perspective view of an embodiment of the disclosure.
Figure 3:
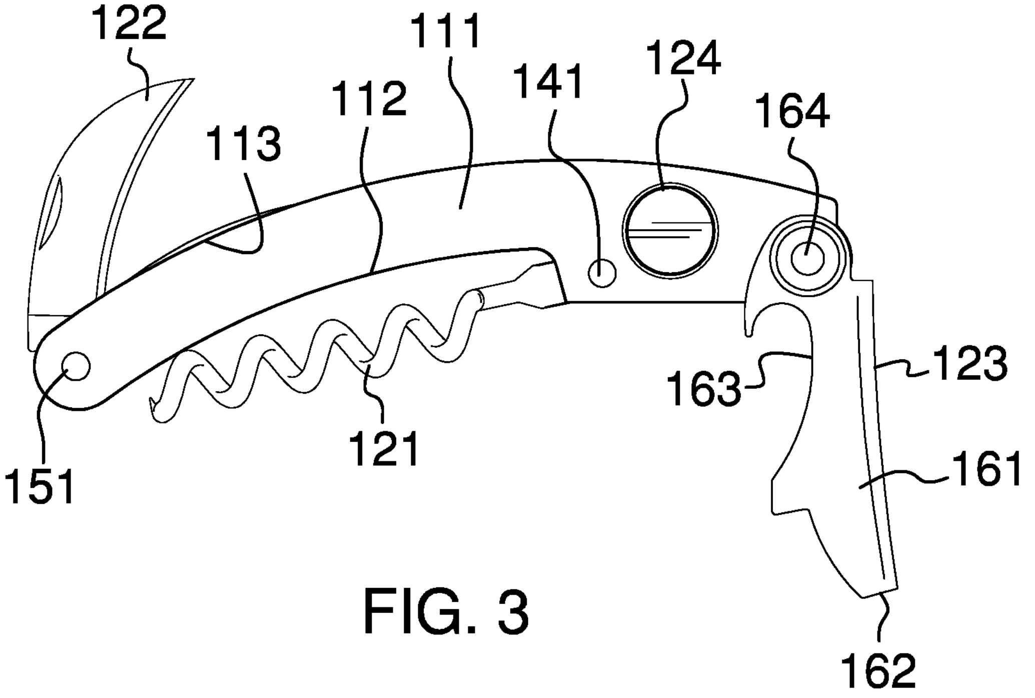
FIG. 3 is a front view of an embodiment of the disclosure.
Figure 4:
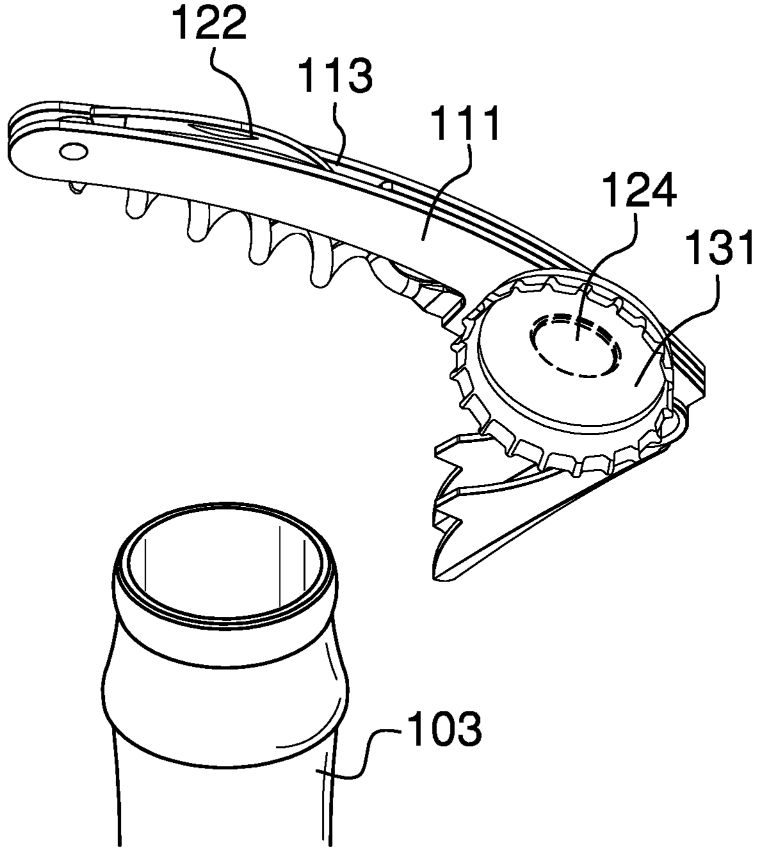
FIG. 4 is an in-use view of an embodiment of the disclosure.

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The bottle opener with magnetic bottle cap retainer 100 (hereinafter invention) is a tool. The invention 100 is configured for use in opening a bottle 103. The invention 100 comprises a handle 101 and a plurality of working elements 102. The handle 101 is a grip used to manipulate each of the plurality of working elements 102. Each of the plurality of working elements 102 forms a working element of the invention 100 used in the process of opening the bottle 103. The invention 100 removes a foil cover from the bottle 103. The invention 100 removes a cork from a bottle 103. The invention 100 removes a bottle 103 cap 131 from the bottle 103. The invention 100 stores the bottle 103 cap 131 that is removed from the bottle 103 for future disposal.

The bottle 103 is a container designed to hold a liquid in anticipation of consumption. The bottle 103 is defined elsewhere in this disclosure. The bottle 103 further comprises a bottle 103 cap 131. The bottle 103 cap 131 is a lid that is used to enclose the open neck of the bottle 103. The bottle 103 cap 131 is a disposable bottle 103 cap 131. The bottle 103 cap 131 is defined elsewhere in this disclosure.

The handle 101 is a disk-shaped structure. The plurality of working elements 102 attach to the handle 101. The handle 101 forms a grip used to manipulate each of the plurality of working elements 102. The handle 101 comprises an irregular disk structure 111, a knife bay 112, and a corkscrew 121 bay 113.

The irregular disk structure 111 is a prism-shaped structure. The irregular disk structure 111 has an irregular prism shape. The irregular disk structure 111 has a disk shape. The irregular disk structure 111 forms the primary shape of the handle 101. The irregular disk structure 111 forms a grip used to manipulate each of the plurality of working elements 102.

The knife bay 112 is a negative space that is formed in a lateral face of the disk structure of the irregular disk structure 111. The knife bay 112 forms a c-channel.

The corkscrew 121 bay 113 is a negative space that is formed in a lateral face of the disk structure of the irregular disk structure 111. The corkscrew 121 bay 113 forms a c-channel.

Each of the plurality of working elements 102 is a mechanical structure. Each of the plurality of working elements 102 attaches to the handle 101. Each of the plurality of working elements 102 physically performs a function provided by the invention 100. A first function performed by the plurality of working elements 102 removes the foil surrounding the neck of a wine bottle 103. A second function performed by the plurality of working elements 102 removes the cork from the neck of a wine bottle 103. A third function performed by the plurality of working elements 102 removes the bottle 103 cap 131 of a beverage bottle 103. A fourth function performed by the plurality of working elements 102 secures the bottle 103 cap 131 removed from the beverage bottle 103 to the handle 101. The plurality of working elements 102 comprises a corkscrew 121, a foil knife 122, a lever tool 123, and a magnet 124.

The corkscrew 121 is the working element selected from the plurality of working elements 102 that performs the second function of the plurality of working elements 102. The corkscrew 121 is a helical coil shaped structure. The corkscrew 121 attaches to irregular disk structure 111 of the handle 101 in the manner of a cantilever. The corkscrew 121 is a rotating structure. The free end of the corkscrew 121 is sharpened to a point. The corkscrew 121 screws into the cork of a wine bottle 103 such that the corkscrew 121 pulls the cork out of the wine bottle 103 as the corkscrew 121 is pulled out of the wine bottle 103.

The corkscrew 121 bay 113 is sized to receive the corkscrew 121 from the plurality of working elements 102 for storage. The corkscrew 121 bay 113 receives the corkscrew 121 for storage. The corkscrew 121 rotates into the corkscrew 121 bay 113 of the handle 101 for storage. The corkscrew 121 rotates out of the corkscrew 121 bay 113 of the handle 101 for use.

The corkscrew 121 further comprises a corkscrew 121 hinge 141. The corkscrew 121 hinge 141 is a rotating structure. The corkscrew 121 hinge 141 attaches the corkscrew 121 to the irregular disk structure 111 such that the corkscrew 121 rotates as described elsewhere in this disclosure. The hinge is defined elsewhere in this disclosure.

The foil knife 122 is the working element selected from the plurality of working elements 102 that performs the first function of the plurality of working elements 102. The foli knife 122 is a knife. The foil knife 122 attaches to irregular disk structure 111 of the handle 101. The foil knife 122 is a rotating structure. The foil knife 122 is a cutting tool that bifurcates a foil that encloses the neck of a wine bottle 103 such that the foil is removed from the wine bottle 103.

The knife bay 112 is sized to receive the foil knife 122 from the plurality of working elements 102 for storage. The knife bay 112 receives the foil knife 122 for storage. The foil knife 122 rotates into the corkscrew 121 bay 113 of the handle 101 for storage. The foil knife 122 rotates out of the corkscrew 121 bay 113 of the handle 101 for use.

The foil knife 122 further comprises a knife hinge 151. The knife hinge 151 is a rotating structure. The knife hinge 151 attaches the foil knife 122 to the irregular disk structure 111 such that the foil knife 122 rotates as described elsewhere in this disclosure. The hinge is defined elsewhere in this disclosure.

The lever tool 123 is the working element selected from the plurality of working elements 102 that performs the third function of the plurality of working elements 102. The lever tool 123 is a mechanical structure that forms a load path used to facilitate the second function of the plurality of working elements 102. The lever tool 123 attaches to irregular disk structure 111 of the handle 101. The lever tool 123 is a rotating structure. The irregular disk structure 111 rotates relative to the lever tool 123 such that the irregular disk structure 111 rotates into the lever tool 123 when the lever tool 123 is in a storage position. The lever tool 123 further comprises a primary lever structure 161, a boot structure 162, a bottle 103 opener 163, and a lever hinge 164.

The primary lever structure 161 is a semi-enclosed prism structure. The primary lever structure 161 has a c-channel shape. A congruent end of the prism structure of the primary lever structure 161 attaches to the irregular disk structure 111 in the manner of a cantilever. The primary lever structure 161 is a rotating structure. The irregular disk structure 111 of the handle 101 rotates into the interior space of the primary lever structure 161 when the primary lever structure 161 is in a storage position. The primary lever structure 161 forms a lever that is used in the performance of the second function and the third function of the plurality of working elements 102.

The boot structure 162 is a mechanical structure mounted on the free congruent end of the cantilever structure formed by the semi-enclosed prism structure of the primary lever structure 161. The boot structure 162 forms a footing that rests on the neck of the bottle 103. The boot structure 162 facilitates the pulling the cork and the corkscrew 121 out of the bottle 103 by transferring the loads generated by process to the neck of the bottle 103.

The bottle 103 opener 163 is a mechanical structure attached to the lateral face of the semi-enclosed prism structure of the primary lever structure 161. The bottle 103 opener 163 forms hooks that catch along the inferior surface of the bottle 103 cap 131 such that the bottle 103 opener 163 can be bent and pried away from the neck of the bottle 103. The span of the length of the primary lever structure 161 provides the leverage necessary for the bottle 103 opener 163 to remove the bottle 103 cap 131 in this fashion.

The lever hinge 164 is a rotating structure. The lever hinge 164 attaches the primary lever structure 161 to the irregular disk structure 111 such that the lever tool 123 and the primary lever structure 161 rotate as described elsewhere in this disclosure. The hinge is defined elsewhere in this disclosure.

The magnet 124 is the working element selected from the plurality of working elements 102 that performs the fourth function of the plurality of working elements 102. The magnet 124 is a disk-shaped structure. The magnet 124 is formed with magnetic properties such that the magnet 124 will attract magnetic materials. The magnet 124 mounts on the exterior surface of a congruent end of the disk structure of the irregular disk structure 111 of the handle 101. The bottle 103 cap 131 magnetically attaches to the magnet 124 when the bottle 103 cap 131 is formed from a magnetic material. The use of the magnet 124 allows an individual to maintain control of the removed bottle 103 cap 131 without having to place the bottle 103 cap 131 in a pocket.

Figure 5:
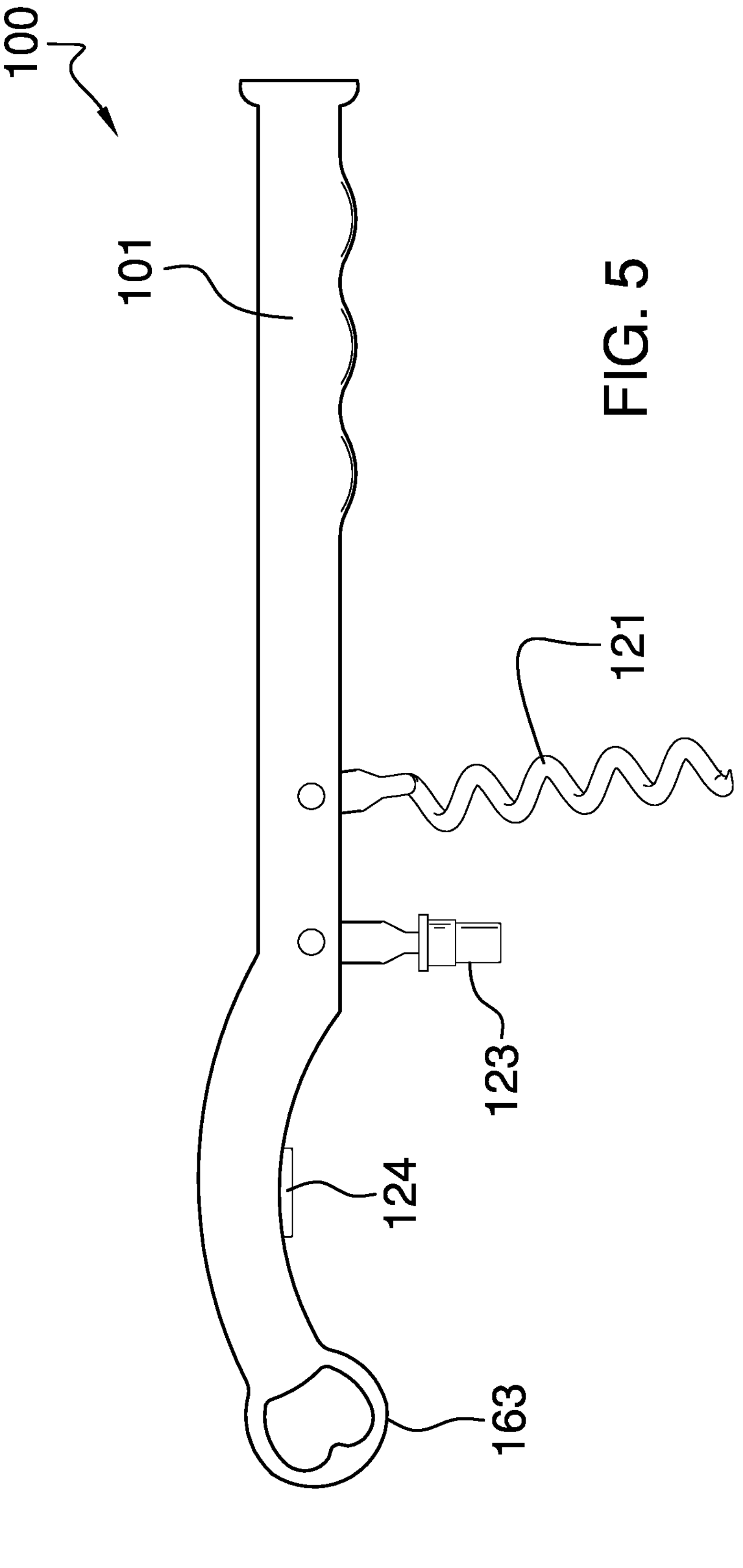
FIG. 5 is a view of an alternative commercial embodiment of the disclosure.

Referring to FIG. 5, the invention 100 includes the handle 101, the corkscrew 121, the lever tool 123, the magnet 124, and the bottle opener 163.

The following definitions were used in this disclosure:

Bifurcate: As used in this disclosure, to bifurcate means to divide an object or space into two pieces or segments.

Blade: As used in this disclosure, a blade is a term that is used to describe: 1) a wide and flat portion of a structure; or, 2) the cutting edge of a tool.

Bottle: As used in this disclosure, a bottle is a container used for the storage of fluids. Access to the interior of a bottle is gained through the neck of the bottle. The neck is an elongated tube that forms an aperture through which fluids can be introduced and removed from the bottle.

Bottle Cap: As used in this disclosure, a bottle cap refers to a lid that is used to enclose the open neck of a bottle. A disposable bottle cap refers to a bottle cap that must be pried off of the neck of the bottle. A reusable bottle cap refers to a bottle cap that attaches to the neck of the bottle using a threaded connection.

C-Channel: As used in this disclosure, the C-channel is a structure that is formed in a U-shape. The C-channel forms a prism shape with a hollow interior and an open face that forms a shape characteristic of the letter C. The open space of the C-channel is often used as a track. A C-channel is a U-shaped structure.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Cap: As used in this disclosure, a cap is a protective cover that encloses a space or opening.

Cavity: As used in this disclosure, a cavity is an empty space or negative space that is formed within an object.

Cork: As used in this disclosure, cork refers to a semi-rigid structure with that: a) floats in water; and, b) is water impermeable. Cork products can be either natural or manufactured. Most cork products are intended to be pierced by sharpened tips from tools such as corkscrews and thumbtacks.

Corkscrew: As used in this disclosure, a corkscrew is a tool used to remove a cork from a bottle. The working element of the corkscrew is a sharpened helical structure.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Foil: As used in this disclosure, a foil is a sheeting formed from a metal. Foils are flexible and are often used to cover a surface. A foil is also referred to as a metal leaf.

Footing: As used in this disclosure, a footing refers to one of a plurality of small pedestals that combine to: a) raise an object above a supporting surface; and, b) transfer the load path of the object to the supporting surface.

Force of Gravity: As used in this disclosure, the force of gravity refers to a vector that indicates the direction of the pull of gravity on an object at or near the surface of the earth.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Helix: As used in this disclosure, a helix is the three-dimensional structure that would be formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute.

Hinge: As used in this disclosure, a hinge is a device that permits the turning, rotating, or pivoting of a first object relative to a second object. A hinge designed to be fixed into a set position after rotation is called a locking hinge.

Hook: As used in this disclosure, a hook is an object that is curved or bent at an angle such that items can be hung on or caught by the object.

Inferior: As used in this disclosure, the term inferior refers to a directional reference that is parallel to and in the same direction as the force of gravity when an object is positioned or used normally.

Knife: As used in this disclosure, a knife is a bladed tool used to cut objects.

Lever: As used in this disclosure, a lever is a simple machine that comprises a shaft that rotates around a fulcrum, axis of rotation, or pivot point.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Magnet: As used in this disclosure, a magnet is an ore, alloy, or other material that has its component atoms arranged so the material exhibits properties of magnetism such as: 1) attracting other iron-containing objects; 26) attracting other magnets; or, 3) or aligning itself in an external magnetic field.

Magnetic Material: As used in this disclosure, a magnetic material is a substance that attracts or is attracted to a magnet but that itself has no net magnetic moment (beyond any residual moment created by prior use). Common classes of magnetic materials include ferromagnetic, diamagnetic, paramagnetic, ferrimagnetic and antiferromagnetic.

Negative Space: As used in this disclosure, negative space is a method of defining an object through the use of open or empty space as the definition of the object itself, or, through the use of open or empty space to describe the boundaries of an object.

Pivot: As used in this disclosure, a pivot is a rod or shaft around which an object rotates or swings.

Primary Shape: As used in this disclosure, the primary shape refers to a description of the overall geometric shape of an object that is assembled from multiple components.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism.

The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Screw: As used in this disclosure, to screw is a verb meaning: 1) to fasten or unfasten (unscrew) a threaded connection; or 2) to attach a helical structure to a solid structure.

Semi-Enclosed Prism: As used in this disclosure, a semi-enclosed prism is a prism-shaped structure wherein a portion of the lateral face of the prism-shaped is removed or otherwise replaced with a negative space.

Simple Machine: As used in this disclosure, a simple machine refers to a device that consists of a mechanism selected from the group consisting of: 1) an inclined plane, 2) a lever; 3) a pivot, 4) a pulley, 5) a screw, 6) a spring, 7) a wedge, and 8) a wheel (including axles). A compound machine is a device that consists of a plurality of mechanisms selected from the group consisting of the simple machine.

Slot: As used in this disclosure, a slot is a prism-shaped negative space formed as a groove or aperture that is formed in an object.

Superior: As used in this disclosure, the term superior refers to a directional reference that is parallel to and in the opposite direction of the force of gravity when an object is positioned or used normally.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Tool: As used in this disclosure, a tool is a device, an apparatus, or an instrument that is used to carry out an activity, operation, or procedure.

U-Shaped Structure: As used in this disclosure, a U-shaped structure refers to a three-sided structure comprising a crossbeam, a first arm, and a second arm. In a U-shaped structure, the first arm and the second arm project away from the crossbeam: 1) in the same direction; 2) at a roughly perpendicular angle to the crossbeam, and, 3) the span of the length of the first arm roughly equals the span of the length of the second arm. The first arm and the second arm project away from the crossbeam in the manner of a cantilever.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A bottle opening tool comprising a handle and a plurality of working elements;

wherein the plurality of working elements attach to the handle;

wherein the handle is a grip used to manipulate each of the plurality of working elements;

wherein the bottle opening tool is a tool;

wherein the bottle opening tool is configured for use in opening a bottle;

wherein each of the plurality of working elements forms a working element of the bottle opening tool used in the process of opening the bottle;

wherein the bottle opening tool removes a foil cover from the bottle;

wherein the plurality of working elements comprises a corkscrew, a foil knife, a lever tool, and a magnet;

wherein the corkscrew is the working element selected from the plurality of working elements that performs the second function of the plurality of working elements;

wherein each of the plurality of working elements physically performs a function provided by the bottle opening tool;

wherein a first function performed by the plurality of working elements removes the foil surrounding the neck of a wine bottle;

wherein a second function performed by the plurality of working elements removes the cork from the neck of a wine bottle;

wherein a third function performed by the plurality of working elements removes the bottle cap of a beverage bottle;

wherein a fourth function performed by the plurality of working elements secures the bottle cap removed from the beverage bottle to the handle;

wherein the magnet is a disk-shaped structure;

wherein the magnet is formed with magnetic properties such that the magnet will attract magnetic materials;

wherein the magnet mounts on the exterior surface of a congruent end of the disk structure of the irregular disk structure of the handle;

wherein the bottle cap magnetically attaches to the magnet.

2. The bottle opening tool according to claim 1 wherein the bottle further comprises a bottle cap;

wherein the bottle opening tool removes a cork from a bottle;

wherein the bottle cap is a lid that is used to enclose the open neck of the bottle;
wherein the bottle cap is a disposable bottle cap;
wherein the bottle opening tool removes a bottle cap from the bottle;
wherein the bottle opening tool stores the bottle cap that is removed from the bottle.

3. The bottle opening tool according to claim 2
wherein the handle is a disk-shaped structure;
wherein the plurality of working elements attach to the handle;
wherein the handle forms a grip used to manipulate each of the plurality of working elements.

4. The bottle opening tool according to claim 3
wherein the handle comprises an irregular disk structure, a knife bay, and a corkscrew bay;
wherein the knife bay and the corkscrew bay are formed in the irregular disk structure.

5. The bottle opening tool according to claim 4
wherein the irregular disk structure is a prism-shaped structure;
wherein the irregular disk structure has an irregular prism shape;
wherein the irregular disk structure has a disk shape;
wherein the irregular disk structure forms the primary shape of the handle;
wherein the irregular disk structure forms a grip used to manipulate each of the plurality of working elements;
wherein the knife bay is a negative space that is formed in a lateral face of the disk structure of the irregular disk structure;
wherein the knife bay forms a c-channel;
wherein the corkscrew bay is a negative space that is formed in a lateral face of the disk structure of the irregular disk structure;
wherein the corkscrew bay forms a c-channel.

6. The bottle opening tool according to claim 5
wherein the corkscrew is a helical coil shaped structure;
wherein the corkscrew attaches to irregular disk structure of the handle in the manner of a cantilever;
wherein the corkscrew is a rotating structure;
wherein the free end of the corkscrew is sharpened to a point.

7. The bottle opening tool according to claim 6
wherein the corkscrew bay is sized to receive the corkscrew;
wherein the corkscrew bay receives the corkscrew for storage;
wherein the corkscrew rotates into the corkscrew bay of the handle for storage;
wherein the corkscrew rotates out of the corkscrew bay of the handle for use.

8. The bottle opening tool according to claim 7
wherein the corkscrew further comprises a corkscrew hinge;
wherein the corkscrew hinge is a rotating structure.

9. The bottle opening tool according to claim 8
wherein the foil knife is a knife;
wherein the foil knife attaches to irregular disk structure of the handle;
wherein the foil knife is a rotating structure.

10. The bottle opening tool according to claim 9
wherein the knife bay is sized to receive the foil knife from the plurality of working elements for storage;
wherein the knife bay receives the foil knife for storage;
wherein the foil knife rotates into the corkscrew bay of the handle for storage;
wherein the foil knife rotates out of the corkscrew bay of the handle for use;
wherein the foil knife further comprises a knife hinge.

11. The bottle opening tool according to claim 10
wherein the knife hinge is a rotating structure;
wherein the knife hinge attaches the foil knife to the irregular disk structure such that the foil knife rotates.

12. The bottle opening tool according to claim 11
wherein the lever tool attaches to irregular disk structure of the handle;
wherein the lever tool is a rotating structure;
wherein the irregular disk structure rotates relative to the lever tool such that the irregular disk structure rotates into the lever tool when the lever tool is in a storage position.

13. The bottle opening tool according to claim 12
wherein the lever tool further comprises a primary lever structure, a boot structure, a bottle opener, and a lever hinge;
wherein the primary lever structure is a semi-enclosed prism structure;
wherein a congruent end of the prism structure of the primary lever structure attaches to the irregular disk structure in the manner of a cantilever;
wherein the boot structure is a mechanical structure mounted on the free congruent end of the cantilever structure formed by the semi-enclosed prism structure of the primary lever structure;
wherein the bottle opener is a mechanical structure attached to the lateral face of the semi-enclosed prism structure of the primary lever structure;
wherein the lever hinge is a rotating structure;
wherein the lever hinge attaches the primary lever structure to the irregular disk structure such that the lever tool and the primary lever structure rotate;
wherein the primary lever structure forms a lever used in the performance of the second function and the third function of the plurality of working elements.

14. The bottle opening tool according to claim 13
wherein the primary lever structure has a c-channel shape;
wherein the primary lever structure is a rotating structure;
wherein the irregular disk structure of the handle rotates into the interior space of the primary lever structure;
wherein the boot structure forms a footing that rests on the neck of the bottle;
wherein the boot structure transfers the loads generated by the process of performing the second function to the bottle;
wherein the bottle opener forms hooks that catch the bottle cap.

* * * * *